United States Patent [19]

Nerone

[11] Patent Number: 4,648,017
[45] Date of Patent: Mar. 3, 1987

[54] CONTROL OF A SERIES RESONANT CONVERTER

[75] Inventor: Louis R. Nerone, Cleveland, Ohio

[73] Assignee: Reliance Electric Company, Cleveland, Ohio

[21] Appl. No.: 884,314

[22] Filed: Jul. 11, 1986

Related U.S. Application Data

[63] Continuation of Ser. No. 698,923, Feb. 6, 1985.

[51] Int. Cl.$^4$ .......................................... H02M 3/315
[52] U.S. Cl. ...................................... 363/28; 363/80; 323/235; 323/319
[58] Field of Search ...................... 363/17, 56, 79, 80, 363/98, 28; 323/235, 319

[56] References Cited

U.S. PATENT DOCUMENTS

| | | | |
|---|---|---|---|
| 4,092,708 | 5/1978 | Gerding et al. | 363/56 |
| 4,301,398 | 11/1981 | Johnson | 363/28 X |
| 4,317,975 | 3/1982 | Mizukawa et al. | 323/235 X |
| 4,342,076 | 7/1982 | Rosswurm et al. | 363/56 |
| 4,417,199 | 11/1983 | Jones | 323/319 |

OTHER PUBLICATIONS

R. H. Baker, "High Frequency Power Conversion with FET-Controlled Resonant Charge Transfer", *PCI*, Apr., 1983, pp. 130-133.

*Primary Examiner*—Patrick R. Salce
*Assistant Examiner*—Emanuel Todd Voeltz
*Attorney, Agent, or Firm*—Michael M. Rickin; Robert B. Sundheim

[57] ABSTRACT

A series resonant converter is interposed between an unregulated voltage source and an output circuit. The converter employs a pair of power switches each, when on, completing a series resonant circuit from the source to a resonant tank circuit including the primary winding of a transformer coupled to the output circuit. The power switches are alternately turned on and off so that sinusoidal current pulses alternately flow in opposite directions in the primary winding at a frequency dependent on input and output conditions. The current flowing in the resonant circuit is monitored and the power switches are additionally controlled to prevent turn on of one switch and turn off of the other when current is still flowing in the resonant circuit.

16 Claims, 5 Drawing Figures

CONTROL OF A SERIES RESONANT CONVERTER

This is a continuation of copending application Ser. No. 698,923 file Feb. 6, 1985.

BACKGROUND OF THE INVENTION

This invention relates to the art of power supplies and, more particularly, to a controller for a series resonant power converter of the switching regulator type.

Power converters are known in the art and typically serve to accept energy from an unregulated energy source, such as a voltage source, and derive therefrom a regulated voltage which is applied to a load circuit. The regulation function is performed by interposing a regulating device between the source of energy and the load circuit. It is known in the prior art to utilize a regulating device, such as a controlled variable impedance interposed between the source and the load. In such case, the variable impedance is continuously varied in its impedance magnitude in order to maintain a constant voltage or current at the load circuit. Such variable impedances dissipate significant amounts of the power transmitted from the source to the load.

Another form of regulating device known in the prior art includes switching type regulating devices interposed between the source of energy and the load. These operate in a discontinuous manner in controlling the rate of energy transmission and, hence, consume less power during the regulating operation than do the variable impedance type regulating devices. The switching device has two modes of operation, fully on and fully off. The switching device is periodically turned on for a time interval to permit energy transfer for purposes of maintaining the power output at a predetermined level.

Typically, such switching type regulating devices employed in power converters utilize semiconductor devices, such as power transistors, as the switching devices. These devices are turned fully on, or saturated, or fully off during operation. When fully on, the semiconductor devices are conducting and little or no power is dissipated. Also, when nonconducting or fully off no power is dissipated therein. Power is, however, dissipated in such a semiconductor device during the time interval of switching from a nonconducting condition to a conducting condition and vice versa. It is during the switching time interval that a substantial amount of power may be dissipated in such a semiconductor device, and if large enough this may severely damage the semiconductor device.

Power converters employing switching type regulators utilizing semiconductor devices as power switchers have typically been operated such that the power switches supply a squarewave signal to a power transformer which couples the power converter to a load. The squarewave operation requires that the power switches dissipate energy whenever voltage and current are interrupted. Consequently, there is a switching loss which is directly related to the operating frequency of the power switches. This has contributed to limiting such power switches to low power applications during high frequency operation. Otherwise, they are operated at a low frequency using, larger components and more space.

It is desirable to provide power converters which are cost effective and which occupy a small amount of space. This, then, necessitates high frequency operation, such as in excess of 20 KHz and preferably at substantially higher frequencies, such as 250 KHz, while transferring large amounts of power, such as on the order of 200 watts or more. In order to achieve such high frequency operation of power switches, it has been proposed to employ sinusoidal operation as opposed to the squarewave operation typically employed in the prior art. Such a proposal is found in the article "High Frequency Power Conversion With FET-Controlled Resonant Charge Transfer", by R. H. Baker, published in the PCI April, 1983 proceedings, pages 130-133. This articles proposes an operation wherein sinusoidal current pulses flow through a series resonant circuit including the primary winding of a power transformer by way of a power switch. Each sinusoidal current pulse terminates to a zero level before the voltage forcing function is withdrawn. As a consequence, the power switches turn on and off at zero current to thereby provide lower component switching loss to reduce component stress.

As reported in Baker, supra, alternate sinusoidal current pulses flow through a series resonant tank circuit. During one half cycle a current pulse flows in a first direction through the primary winding by way of a first power switch and a first capacitor. During the next half cycle a current pulse flows in the opposite direction through the transformer primary winding by way of a second power switch and a second capacitor. These two power switches are each turned on for a fixed time duration with the on times being separated by a minimum fixed interval or dead time during which one switch is turned off and the other is turned on. It is assumed in Baker, supra, that the current flowing through the resonant tank circuit is zero during this dead time interval and, hence, that switching operation of the power switches will not dissipate energy. This, however, ignores fluctuations in the unregulated power supply or in the loading of the output. These flunctuations may vary the time duration of current flow. Thus, a short on the output may cause the trailing edge of the current pulse to lag somewhat into the dead time interval. In such case the switching on and off of the power switches will cause energy to be dissipated, resulting in inefficiency of power transfer and a high potential of component damage or destruction.

Additionally, Baker's dead time interval has a minimum duration of two microseconds at the maximum frequency of operation under full power conditions wherein the full cycle of operation is 12 microseconds in duration. Each switch is on for four microseconds. Consequently at full power, current flows only for 8 microseconds out of a 12 microsecond cycle, or for only $\frac{2}{3}$ of a cycle. This limits the amount of power that may be transferred during an operating cycle at full power conditions.

SUMMARY OF THE INVENTION

It is an object of the present invention to provide improved control of a series resonant power converter to ensure that the power switches are turned on and off at essentially zero current levels.

It is a still further object of the present invention to provide such improved control while permitting the operating frequency to approach that of the maximum resonant frequency of the series resonant circuit so that power may be transferred over a greater portion of each operating cycle.

The foregoing and other objects are obtained by the present invention. The invention contemplates the provision of a series resonant converter interposed between an unregulated voltage source and a load. The converter employs a pair of power switches each, when on, completing a series resonant circuit from the voltage source to a resonant tank circuit including the primary winding of a power transformer coupled to the load. The power switches are alternately turned on and off so that sinusoidal current pulses alternately flow in opposite directions in the primary winding with the pulse frequency being dependent on the input and output conditions.

In accordance with the present invention, the current flowing in the series resonant circuit is monitored and the power switches are additionally controlled so as to cause the their conducting one of the switches to turn off only when little or no current is flowing in the resonant circuit.

DESCRIPTION OF THE DRAWINGS

The foregoing and other objects and advantages of the invention will become more readily apparent from the following description of the preferred embodiment of the invention when taken in conjunction with the accompanying drawings which are a part hereof and wherein.

DESCRIPTION OF THE PREFERRED EMBODIMENT

Figure 1:
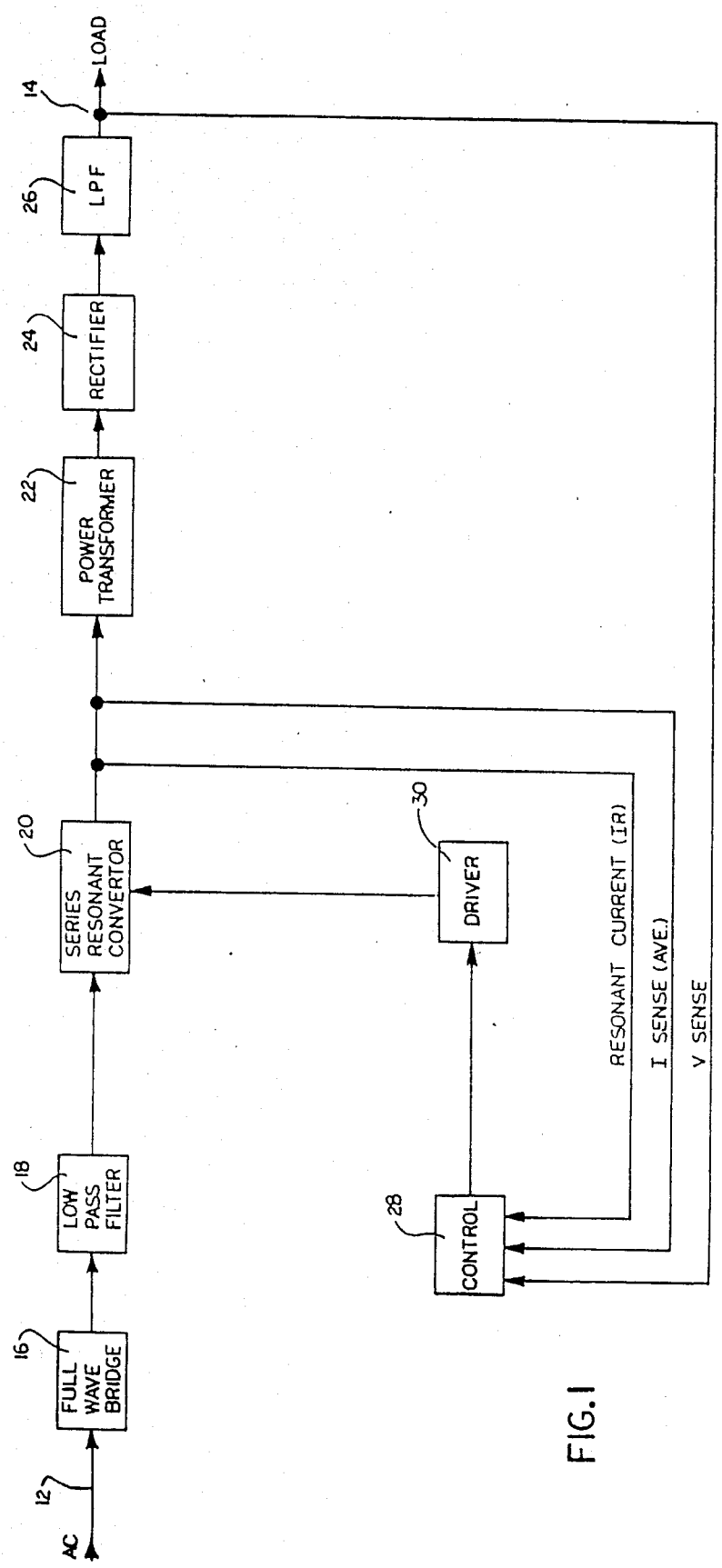
FIG. 1 is a block diagram illustration of one application of the invention in a power supply.

Reference is now made to the drawings wherein the showings are for purposes of illustrating a preferred embodiment only. Referring now to FIG. 1, there is shown a block diagram of a high frequency power supply 10 which converts an AC voltage at its input 12 to a regulated DC voltage at its output 14. This is achieved by first rectifying the AC voltage by means of a full wave bridge rectifier 16 and this rectified voltage is then filtered by a low-pass filter (LPF) 18 providing at the output of the filter an unregulated DC voltage.

Supply 10 includes a series resonant power converter 20 which receives the unregulated DC voltage from the low-pass filter 18 and provides the regulated DC voltage at output terminal 14. As will be discussed in greater detail hereinafter, the converter 20 includes a pair of power switches, preferably field effect transistors (FETS), which are arranged in a series half bridge configuration. These are alternately turned fully on and fully off through the use of a pulse position modulation (PPM) technique. In this technique, for stable input and output conditions pulses of constant width are applied to the gate electrodes of the FETS to turn them on for a fixed duration. It is the frequency at which these pulses are applied to the FETS that determines the transfer of power and which is controlled in accordance with the invention herein. The series resonant converter includes the primary winding of the power transformer 22 and the secondary winding is coupled to the output by means of a rectifier 24 and a low-pass filter 26.

The switching of the FETS and therefore the operation of supply 10 is generally controlled as a function of either the voltage present at the output terminal 14 or the average current flowing in the primary winding of the power transformer 22. Ordinarily, the supply 10 operates in a voltage controlled mode to provide regulated DC voltage at output 14. As the load varies, the switching of the FETS is controlled to maintain the regulated output.

In addition to regulation based on loading, control 28 also responds to the average current flowing in the series resonant circuit. Consequently, the rate at which current pulses are applied through the power switches and, hence, the series resonant converter circuit is controlled to limit the magnitude of the average current and thereby prevent damage to sensitive power components such as FETs and rectifiers.

Additionally, as will be brought out in detail herein, the current pulses flowing through the series resonant converter 20 are supplied at a frequency dependent upon the magnitude of the series resonant current flowing therethrough. It is these three inputs, output voltage, average current and resonant current that are supplied to the control 28 which, in turn, operates a driver circuit 30 to control the switching of the FETS in the series resonant converter.

Figure 2:
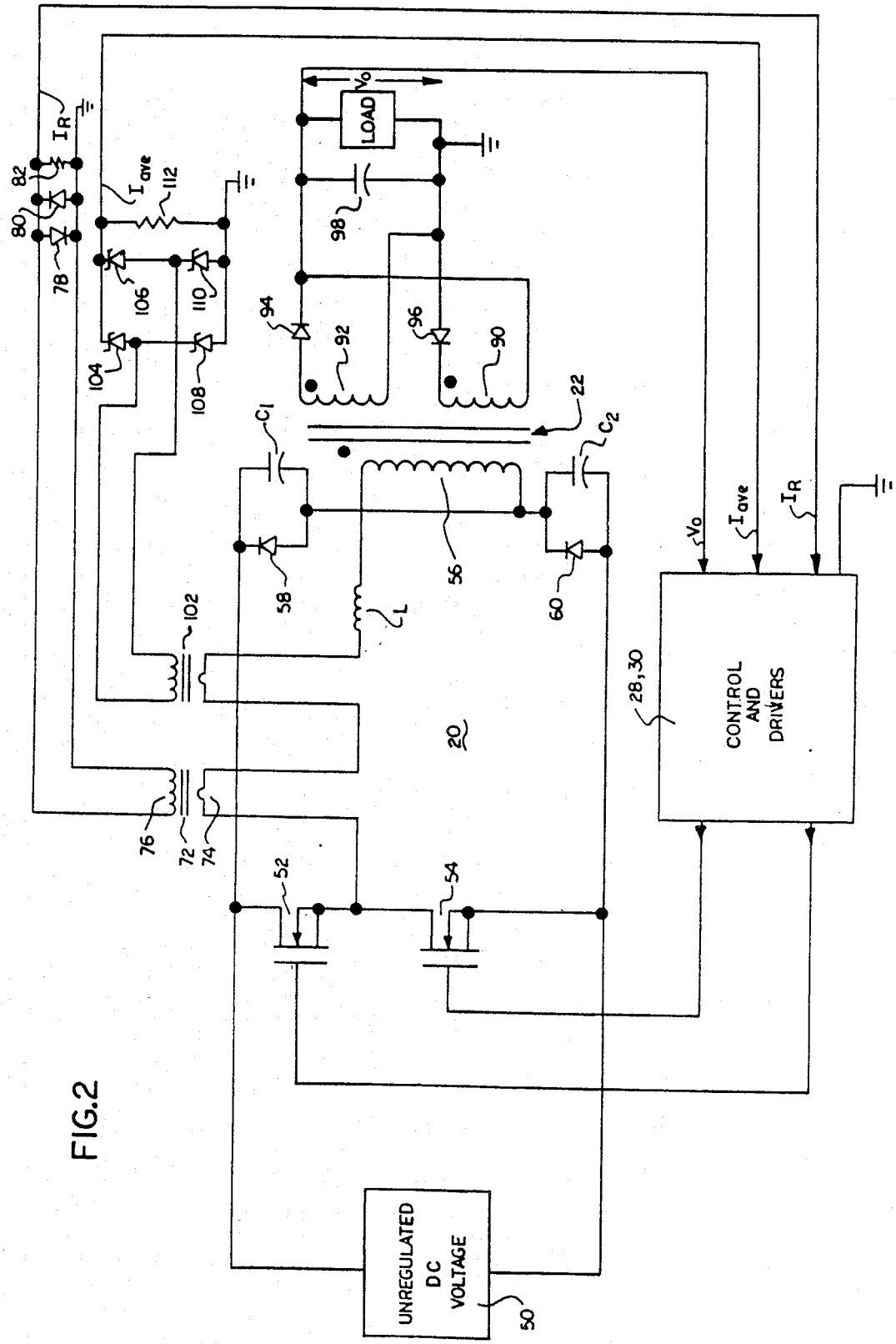
FIG. 2 is a schematic-block diagram illustration of the resonant converter and control therefor.

Having briefly described the operation of a power supply in conjunction with FIG. 1, attention is now directed to FIG. 2, which illustrates the series resonant converter 20 and the power transformer 22 in somewhat greater detail. The input to the converter is shown in FIG. 2 as being an unregulated DC voltage 50 which is representative of the output of the low-pass filter 18 in FIG. 1. The converter includes a pair of field effect transistors 52 and 54 which are alternately gated into conduction, or fully on, by the converter control 28. Whenever one of the field effect transistors is turned on, it completes a path for current to flow from the voltage source 50 through a series resonant circuit including the primary winding 56 of power transformer 22 and a series inductor L together with one of two capacitors $C_1$ and $C_2$. Diodes 58 and 60 connected in parallel with capacitors $C_1$ and $C_2$, respectively, constrain the voltage excursions across these capacitors, thereby stabilizing the resonant tank circuit. The inductor L may be present in fact or it may represent the leakage reactance of the transformer.

Figure 3:
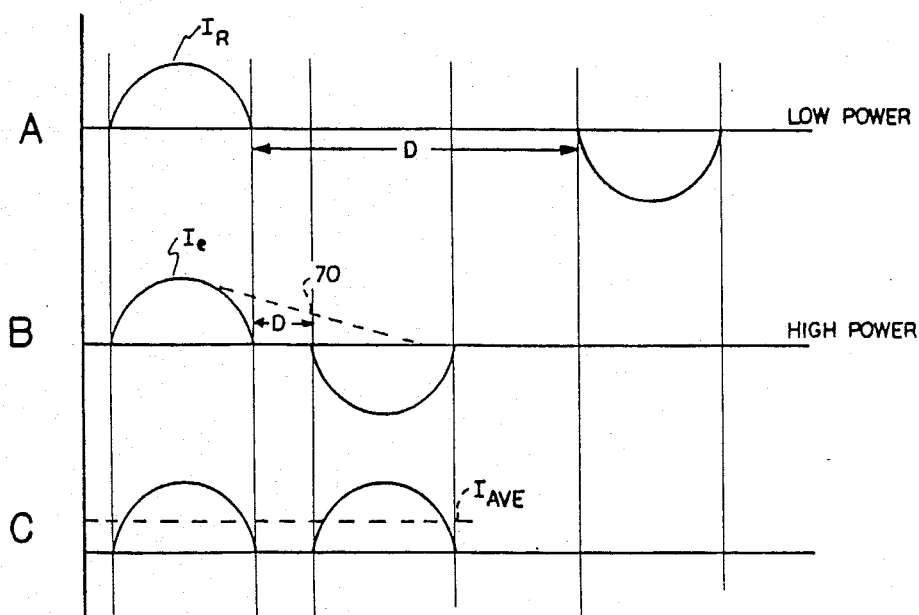
FIGS. 3A-3C are waveforms of current pulses flowing in the resonant circuit.

In operation, as control 28 turns on one of the FETS 52 and 54, a current pulse flows through the resonant circuit. Each pulse has a rise time and fall time dependent on the components in the resonant tank circuit and appears in the form of a sinusoidal pulse. At steady state conditions, these pulses will be uniformly sinusoidal in shape and have a fixed width and a fixed peak value. The current pulses $I_R$ flowing through the series resonant circuit are represented, for example, in FIGS. 3A and 3B. At low power, or low loading conditions, the current pulses occur at a low frequency of operation of the FETS 52 and 54. As demand increases for higher power operation, these pulses occur at a greater frequency as is shown in FIG. 3B. To achieve operation without the FETS 52 and 54 being on at the same time, then the frequency of supplying the current pulses must be held to be somewhat less than that of a maximum resonant frequency $F_M$ which is determined by the components of the resonant tank circuit. Consequently, a dead time D between sinusoidal pulses may be substantial at low power requirements, but quite short during high power requirements.

In Baker, supra, a minimum switch off or dead time is set to a value of two microseconds. Each power switch has a fixed on duration of four microseconds. At maximum power, then, the total off time is four microseconds out of a cycle length of twelve microseconds. This limits Baker's maximum operating frequency to a value substantially less than his maximum resonant frequency $F_M$. The higher the operating frequency, the greater the amount of power which may be transferred. Baker's fixed minimum dead time limits the power transfer characteristics.

The switching on (or off) of such power switches can be accomplished during periods of no current flowing in the resonant circuit in less time than setting such an arbitrary dead time interval. Instead, a determination can be made as to whether current is actually flowing in the resonant circuit and, if it is not, then one power switch can be turned off and the other turned on without dissipating power across a power switch. This is achieved by the control circuitry to be described herein.

During some loading conditions, such as a short circuit of the output, the trailing edge of a current pulse may exceed the arbitrary minimum dead time interval proposed by Baker, supra, as is indicated by the trailing edge shown by dotted lines 70 in FIG. 3B. If the power switches are now actuated, one turned off and the other turned on, substantial current will still be flowing through the resonant circuit. Energy will be dissipated at the power switches, which may result in component failure. In accordance with the present invention, circuitry is provided in the control 28 to ensure that the resonant current flow is at essentially a zero level before enabling switch turn on (or turn off).

The resonant current $I_R$ flowing in the resonant circuit is sensed with a current sensing transformer 72 having a single turn primary winding 74 connected in the series resonant circuit and a multiple turn (such as 60 turns) secondary winding 76 connected to a wave shaping circuit. The wave shaping circuit includes a pair of oppositely poled clipping diodes 78 and 80 so as to develop a voltage across a resistor 82 representative of a processed or peak clipped current. The waveform would appear as in FIGS. 3A or 3B, but with the peaks clipped off. This voltage is representative of the resonant current $I_R$ and is supplied as one input to the control 28.

In addition to sensing and processing the resonant current for use in controlling the switching of power switches 52 and 54, the controller 28 also senses the average current $I_{AVE}$, as well as the output voltage $V_O$ for use in controlling the frequency of operation of the power switches. The output voltage $V_O$ is taken across the load which is on the secondary side of the power transformer 22. This power transformer 22 has secondary recitification taken from a pair of secondary windings 90 and 92, poled as shown, and interconnected with diodes 94 and 96 to maintain a constant charge across a capacitor 98 for supplying the load. The output voltage is taken across the load and is supplied to the control 28. As the load requirements increase because of a loading effect, the frequency of the current pulses in the resonant circuit will be increased.

Control 28 also monitors the average current flowing in the resonant circuit. If the average current is considered too high for proper usage of the FETS, then the frequency of supplying current pulses through the resonant circuit will be decreased to prevent destruction of the FETS. The average current may be sensed as with a current transformer 102 having a single turn primary winding in series with the resonant circuit and its secondary winding, on the order of 60 turns, connected to a full wave bridge rectifier made up of Schottky diodes 104, 106, 108 and 110. The full wave recitified current may take the form as shown by the pulsating waveform in FIG. 3C. A voltage representative of the average current $I_{ave}$ may be developed across an output resistor 112. This voltage is supplied to the control 28.

Figure 4:
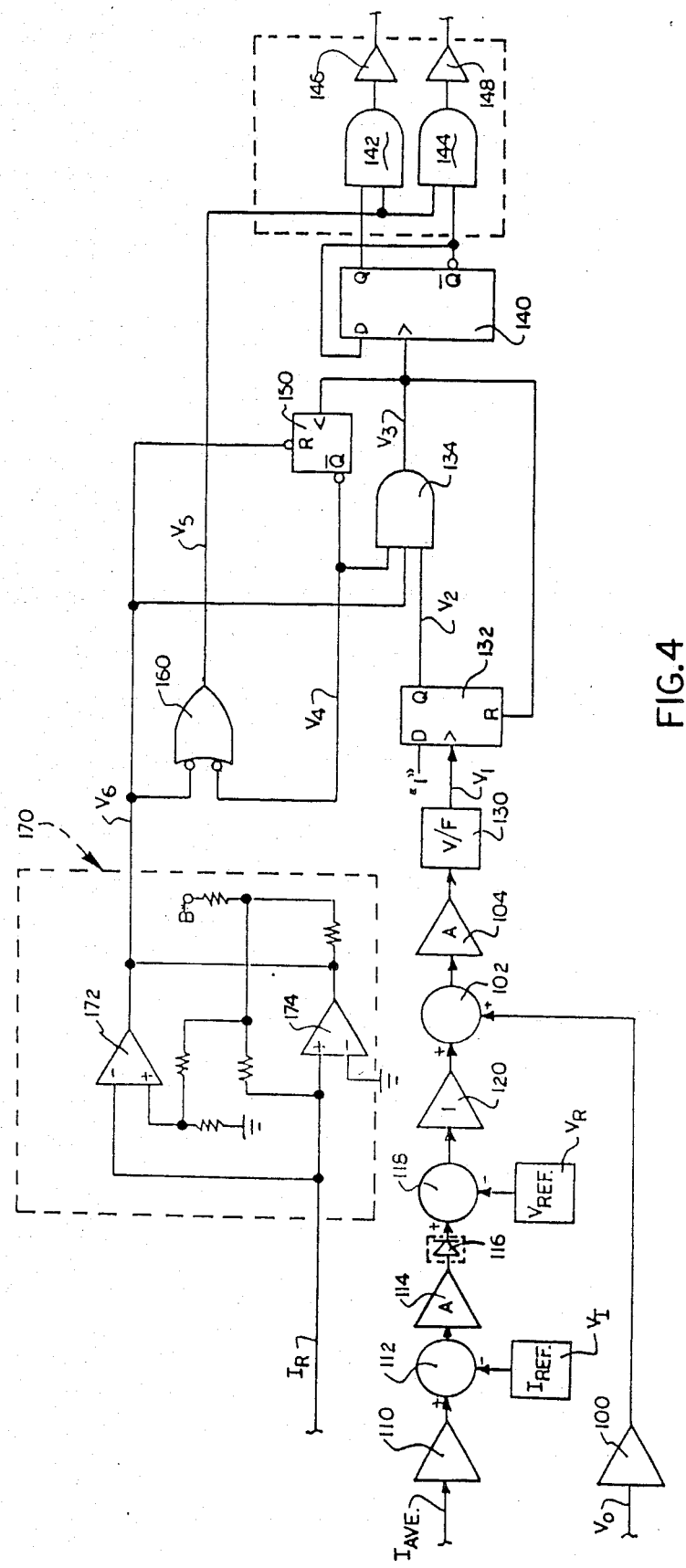
FIG. 4 is a schematic-block diagram illustration of a control for a series resonant converter illustrating one embodiment of the invention herein; and, FIGS. 5A-5F are waveforms of voltages useful in describing the operation of the control in FIG. 4.

Reference is now made to FIG. 4 which illustrates the control 28 and the driver circuit 30 in greater detail. The sensed output voltage $V_O$ is received by control 28 and is amplified by an amplifier 100, which may suitably take the form of an operational amplifier, with the amplified output then being supplied as a positive input to a summing node 102. Here, the output voltage $V_O$ is effectively compared with a reference voltage $V_R$ to develop an error signal $V_E$, after being amplified by an amplifier 104 having a gain of A. The error signal $V_E$ is used to control the frequency at which current pulses are supplied to the series resonant circuit. This error signal is a DC voltage which may vary in magnitude from a negative value to a positive value. At its maximum positive value, it indicates that the output voltage $V_O$ is too high and should be reduced. In such case, the frequency of supplying current pulses is reduced. As the error signal $V_E$ becomes less positive or more negative, it indicates loading has taken place and that more power should be transferred and, hence, the frequency of supplying current pulses to the resonant circuit should be increased.

The error signal $V_E$ may be modified if the sensing circuit determines that the average current $I_{ave}$ flowing through the resonant circuit is too high. In such a case, the frequency of supplying current pulses to the resonant circuit should be reduced to lower the value of average current. For this reason, the average current is compared against a reference, and if it exceeds the reference, then the frequency of supplying pulses to the resonant circuit will be decreased by increasing the magnitude of the error signal $V_E$ in a positive direction. Otherwise, no change is made to the magnitude of the error signal.

The sensed signal representative of the average current $I_{ave}$ is actually a voltage signal representative of this current. This voltage signal is amplified by a DC amplifier 110, which may take the form of a suitable operational amplifier, and is then supplied as a positive input to a summing circuit 112. Here, the voltage representative of the average current is compared with a voltage $V_I$ representative of a current reference and the difference in voltage levels is amplified by a suitable amplifier 114. If the amplified difference voltage is positive, then, this is indicative that the average current exceeds the reference current. This positive voltage will be passed by a diode 116 as a positive input to a summing circuit 118 which receives the voltage reference $V_R$ as a negative input. The summed signal is amplified by an amplifier 120, having a gain of 1, and is supplied as a positive input to the summing node 102. If the average current is greater than the reference current, then the effect of this is to increase in a positive direction the error signal $V_E$ so as to lower the frequency of supplying current pulses to the resonant circuit. If the average current is less than the reference current, then no voltage will be passed by diode 116 and no change will be made to the error signal $V_E$.

The error signal $V_E$ is converted by a voltage-to-frequency converter 130 so as to produce a squarewave pulse train having a frequency which varies inversely with that of the error voltage. As discussed previously, the transfer characteristics are such that when the error signal $V_E$ is positive at its maximum value, the frequency of the pulses from converter 130 decrease to produce low power operation. However, as the error signal becomes less positive or more negative, then the frequency of the pulses from converter 130 increase to provide for higher power operation. This may be envisioned with reference to the waveform in FIG. 5A which shows, during low power operation, the frequency of the squarewave output voltage $V_1$ from converter 130 is low and then increases in frequency for one-half power and full power operations.

Figure 5:
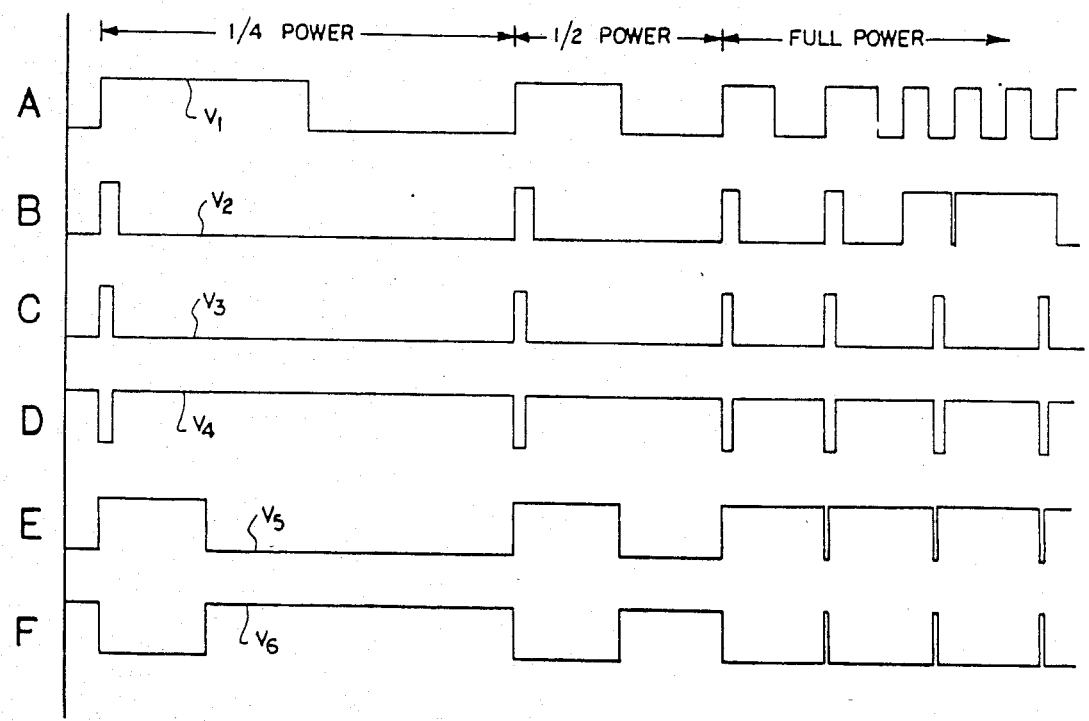

The voltage-to-frequency converter 130 may take the form of a typical voltage controlled oscillator and when the output voltage $V_1$ goes positive, as shown in FIG. 5A, it is supplied to the clock input of a D-type flip-flop 132 having its D input tied to a positive or binary 1 voltage level. Consequently, when converter voltage $V_1$ goes high, this causes the Q output voltage $V_2$ to go high, as is indicated in the waveform of FIG. 5B. This positive voltage $V_2$ is supplied as one input to an AND gate 134. This is a three input AND gate and at this stage in the operation, the other two inputs are enabled by positive voltage signals, and consequently, after a slight propagation time, the output voltage $V_3$ of AND gate 134 will go high, as indicated by the waveform of voltage $V_3$ in FIG. 5C.

Each time the output voltage $V_3$ of AND gate 134 goes high, it clocks a D-type flip-flop 140 in the driver control 30. This flip-flop has its $\overline{Q}$ output inverted and fed back to the D input thereof so that the flip-flop acts as a divide-by-two counter. Consequently, as positive going pulses are supplied to the clock input, the Q and $\overline{Q}$ outputs alternately provide high or binary 1 signals to AND gates 142 and 144. These gates are enabled so long as voltage $V_5$ is high. The AND gates alternately supply gate driver pulses by way of amplifier buffers 146 and 148 to alternately turn on the power switches 52 and 54 in the resonant converter. The time duration that each power switch is turned on is dependent upon the time duration that the voltage $V_5$ is high. This is discussed in detail hereinafter.

The output voltage $V_4$ of a one-shot circuit 150 is normally high so as to provide an enabling input to the AND gate 134. Similarly, voltage $V_6$ is normally high providing a second enabling input to the AND gate 134. Consequently, AND gate 134 is normally conditioned for voltage $V_2$ to become high and then its output voltage goes high to clock the flip-flop 140, as discussed above. When output voltage $V_3$ goes high, it also actuates the one-shot circuit 150 causing its output voltage $V_4$ to go low, as seen in the waveform of FIG. 5D, and thereby remove the enabling input to AND gate 134. After a slight propagation time, the output voltage $V_3$ returns to its normal low level, as is seen in FIG. 5C. The one-shot circuit 150 produces a low level pulse of a fixed time duration unless the one-shot circuit is reset earlier by voltage $V_6$ going low. The output voltage $V_4$ of the one-shot circuit is applied to one input of a NAND gate 160. If either input to gate 160 goes negative, then the output voltage $V_5$ of this gate, after a short propagation time, will go high, as is seen in FIG. 5E.

When voltage $V_5$ goes high it is passed by one of the AND gates 142 and 144 to turn on one of the power switches. If the second input voltage $V_6$ to gate 160 remains high, the drive enable signal $V_5$ will go low to turn off the power switch once the one-shot circuit 150 has timed out. The one-shot period is selected to be slightly greater than the resonant period, determined by the tank circuit. This will permit operation even if the resonant current detector circuit fails.

In accordance with the present invention, control of the switching frequency of the power switches 52 and 54 is also determined by sensing the current flowing in the series resonant circuit. This is done to ensure that the resonant current flow is essentially at a zero level before turning on one power switch before turning the other off. The voltage representative of the resonant current $I_R$ is applied to a dual voltage comparator 170. The voltage is supplied to the inverting input of one operational amplifier 172 and to the noninverting input of a second operational amplifier 174. These amplifiers have their outputs ORed together by a direct connection. So long as the output voltage representative of the resonant current $I_R$ is at a zero level, the output voltage $V_6$ is high. However, if current is flowing in the resonant circuit as either a positive sinusoidal pulse or a negative sinusoidal pulse, the output voltage $V_6$ will go low. A small hysteresis effect takes place such that upon turn on of resonant current, approximately 10% of the peak value of a current pulse will be required before $V_6$ goes low and, on turn off, approximately 2% of the peak value is required before $V_6$ goes high. These are within acceptable levels for minimal current flow in the power switches without causing damage. But for the slight hysteresis, it may be assumed that at the zero current $V_6$ is high and when current flows $V_6$ is low.

During start up of the power converter because of loading, AND gate 134 will clock flip-flop 140. One of the power transistors will be turned on providing the output voltage $V_5$ of gate 160 is high. This occurs because when the output voltage $V_3$ of the AND gate goes high to clock flip-flop 140, it also clocks the one-shot 150 so that after a short propagation time its output voltage $V_4$ goes low. The output voltage $V_4$ is supplied to one input of the gate 160 causing its output $V_5$ to go high. This is passed by one of the AND gates 142 and 144 to turn on one of the power switches 52 and 54. Current will now flow in the series resonant circuit. In the absence of any change now taking place at the unregulated source or at the load, this current will be a sinusoidal pulse of a duration determined by the resonant circuit.

Comparator 170 now monitors the resonant current flow. If current is flowing in the resonant circuit, then output voltage $V_6$ goes low (see FIG. 5F). When the voltage $V_6$ goes low, it supplies a second low input to gate 160 to maintain its output voltage $V_5$ high to keep the power switch turned on. As the voltage $V_6$ goes low, it also resets the one-shot 150 so that its output voltage $V_4$ returns to its normally high voltage level. However, so long as comparator 170 detects that current is flowing in the resonant circuit, it will maintain output voltage $V_6$ low. Voltage $V_5$ will remain high to keep the power switch on. Once the current flow is zero, the output voltage $V_6$ of the comparator will return to its normal high level. This causes voltage $V_5$ to go low and turn off the power switch. The other power switch can now be turned on when AND gate 134 next clocks flip-flop 140 and one-shot circuit 150.

In the example herein, a circuit was tested employing sinusoidal pulses having a normal pulse width of 2.5 microseconds. During stable source and load conditions, this circuit was able to run during full power conditions at a frequency that closely approached the maximum resonant frequency. During such operation, the dead time was on the order of 0.3 microseconds between current pulses. This was sufficient time to turn off one power switch and turn on the other. Power conversion was efficient as power was transferred for 5.0 microseconds over a 5.6 microsecond operating cycle. Thus, power is transferred for 89% of the operating cycle.

In summation, monitoring the current flow in the resonant circuit permits the frequency of supplying current pulses to the resonant circuit to approach the maximum resonant frequency $F_M$, while at the same time preventing turn on of one power switch while current is still flowing through the other power switch. Consequently, the dead time between current pulses flowing through the resonant circuit is variable, depending on the power load requirements. During high power requirements, the dead time is not an arbitrary time period, but is a time period during which circuitry senses essentially zero current flow in the resonant circuit before permitting turn on and turn off of the power switches without dissipating power thereacross.

Although the invention has been described in conjunction with a preferred embodiment, it is to be appreciated that various modifications may be made without departing from the spirit and scope of the appended claims.

Having described a specific preferred embodiment of the invention, the following is claimed:

1. A series resonant converter for supplying regulated power to an output circuit from an unregulated DC source, comprising:
    (a) power conversion means comprising:
        (i) a series resonant circuit including a primary winding of a transformer coupling said converter to a said output circuit; and
        (ii) first and second actuatable switching means each, when on, connecting said source with said series resonant circuit in such a manner that when said switching means are alternately turned on sinusoidal current pulses alternately flow from said source in opposing directions in said primary winding; and
    (b) control means comprising:
        (i) first control means for actuating said switching means on and off at an operating frequency depending upon loading conditions at said output circuit; and
        (ii) second control means connected to said first control means for controlling said first control means in dependence upon whether current is flowing in said resonant circuit in such a manner as to allow said first control means to actuate said switching means so as to cause that one of said switching means which is then on to be turned off only when minimal or no current is flowing in said resonant circuit.

2. A converter as set forth in claim 1 wherein said second control means includes current detector means for determining whether or not minimal or no current is flowing in said resonant circuit and providing a control signal having a value in dependence upon said determination and means responsive to said control signal for supplying a signal to said first control means for causing said first control means to actuate the then conducting switching means to be turned off only when said control signal has a value indicative that minimal or no current is flowing in said resonant circuit.

3. A converter as set forth in claim 1 including driver generator means coupled to said first and second switching means for supplying driver signals to actuate said switching means on and off at said operating frequency, said first control means coupled to said driver generator means for allowing said driver signals to be supplied at said operating frequency and said second control means responsive to said resonant current for preventing said first control means from allowing said driver generator means to supply that one of said driver signals which turns off that one of said switching means which is then on until minimal or no current is flowing in said resonant circuit.

4. A converter as set forth in claim 3 wherein said second control means includes current detector means for determining whether or not minimal or no current is flowing in said resonant circuit and providing a control signal having a value in dependence upon said determination and means responsive to said control signal for supplying a signal to said first control means for preventing said first control means from allowing said driver generator means to supply said driver signals which turns off said then on one of said switching means until minimal or no current is flowing in said resonant circuit.

5. A converter as set forth in claim 3 including switch select means for selecting the then on one of said switching means and switch driver means for passing said one of said driver signals which turns off said then on one of said switching means to actuate the selected switch means to an off condition.

6. A converter as set forth in claim 5 including switch reversal means for periodically supplying a switch reversal signal commanding that one of said switching means be turned on and the other be turned off, said switch reversal signals being provided at a frequency depending on loading conditions and providing that minimal or no current is flowing in said resonant circuit.

7. A converter as set forth in claim 6 wherein said switch select means is responsive to said switch reversal signals for alternately selecting one of said switching means to be on.

8. A converter as set forth in claim 7 wherein said second control means provides a control signal having a value in dependence upon whether or not minimal or no current is flowing in said resonant circuit, said converter including means for providing pulses exhibiting a frequency which varies in dependence upon said loading conditions, said switch reversal means being responsive to said pulses and to said control signal for supplying a said switch reversal signal for each said pulse providing said control signal is of a value indicative that minimal or no current is flowing in said resonant circuit whereby said switch select means will change its selection from one of said switching means to the other and the thus selected switching means will pass said switch on signal to the selected switching means.

9. A series resonant converter for supplying regulated power to an output circuit from an unregulated DC source, comprising:
    (a) power conversion means comprising:

(i) a series resonant circuit including a primary winding of a transformer coupling said converter to a said output circuit; and (ii) first and second actuatable switching means each, when on, connecting said source with said series resonant circuit in such a manner that when said switching means are alternately turned on sinusoidal current pulses alternately flow from said source in opposing directions in said primary winding; and (b) control means comprising:

(i) first control means for generating a signal for actuating said switching means on and off at an operating frequency depending upon loading conditions at said output circuit; and (ii) second control means responsive to current flowing in said resonant circuit, said second control means connected to said first control means for allowing said actuating signal to be electrically connected to said switching means so as to cause that one of said switching means which is then on to be turned off only when minimal or no current is flowing in said resonant circuit.

10. A converter as set forth in claim 9 wherein both of said first and second actuatable switching means each have a control electrode and said actuating signal is applied to said control electrode.

11. A converter as set forth in claim 9 including driver generator means coupled to said first and second switching means for supplying driver signals to actuate said switching means on and off at said operating frequency, said driver generator means generating said driver signals in response to said actuating signal.

12. A converter as set forth in claim 11 wherein said second control means includes current detector means for determining whether or not minimal or no current is flowing in said resonant circuit and providing a control signal having a value in dependence upon said determination and means responsive to said control signal for supplying a signal to said first control means for preventing said first control means from allowing said actuating signal to be connected to said driver generator means until minimal or not current is flowing in said resonant circuit.

13. A converter as set forth in claim 11 including switch select means for selecting the then on one of said switching means and switch driver means for passing said one of said driver signals which turns off said then on one of said switching means to actuate the selected switch means to an off condition.

14. A power module of the series resonant type for supplying regulated power to an output circuit from an unregulated DC source, comprising:

(a) a series resonant circuit including a primary winding of a transformer coupling said power module to a said output circuit;

(b) first and second switching means each, when on, connecting said source with said series resonant circuit in such a manner that when said switching means are alternately turned on sinusoidal current pulses alternately flow from said source in opposing directions in said primary winding; and (c) driver generator means coupled to said switching means for supplying driver signals to alternately turn off that one of said switching means which is on and turn on that one of said switching means which is off;

(d) first control means coupled to said driver generator means for allowing said driver signals to be supplied at a repetition rate which is dependent upon loading conditions at said output circuit such that said switching means are turned on and off at an operating frequency depending upon said loading conditions; and (e) second control means connected to said first control means, said second control means responsive to said resonant current for preventing said first control means from allowing said driver generator means to supply that one of said driver signals which turns off said on switching means until minimal or no current is flowing in said resonant circuit.

15. A power module as set forth in claim 14 wherein both of said first and second switching means each have a control electrode, said driver signals being applied to said control electrode.

16. A power module as set forth in claim 14 wherein said second control means includes current detector means for determining whether or not minimal or no current is flowing in said resonant circuit and providing a control signal having a value in dependence upon said determination and means responsive to said control signal for supplying a signal to said first control means for preventing said first control means from allowing said driver generator means to supply said driver signals which turns off said then on one of said switchihg means until minimal or no current is flowing in said resonant circuit.

* * * * *